United States Patent Office 2,818,276
Patented Dec. 31, 1957

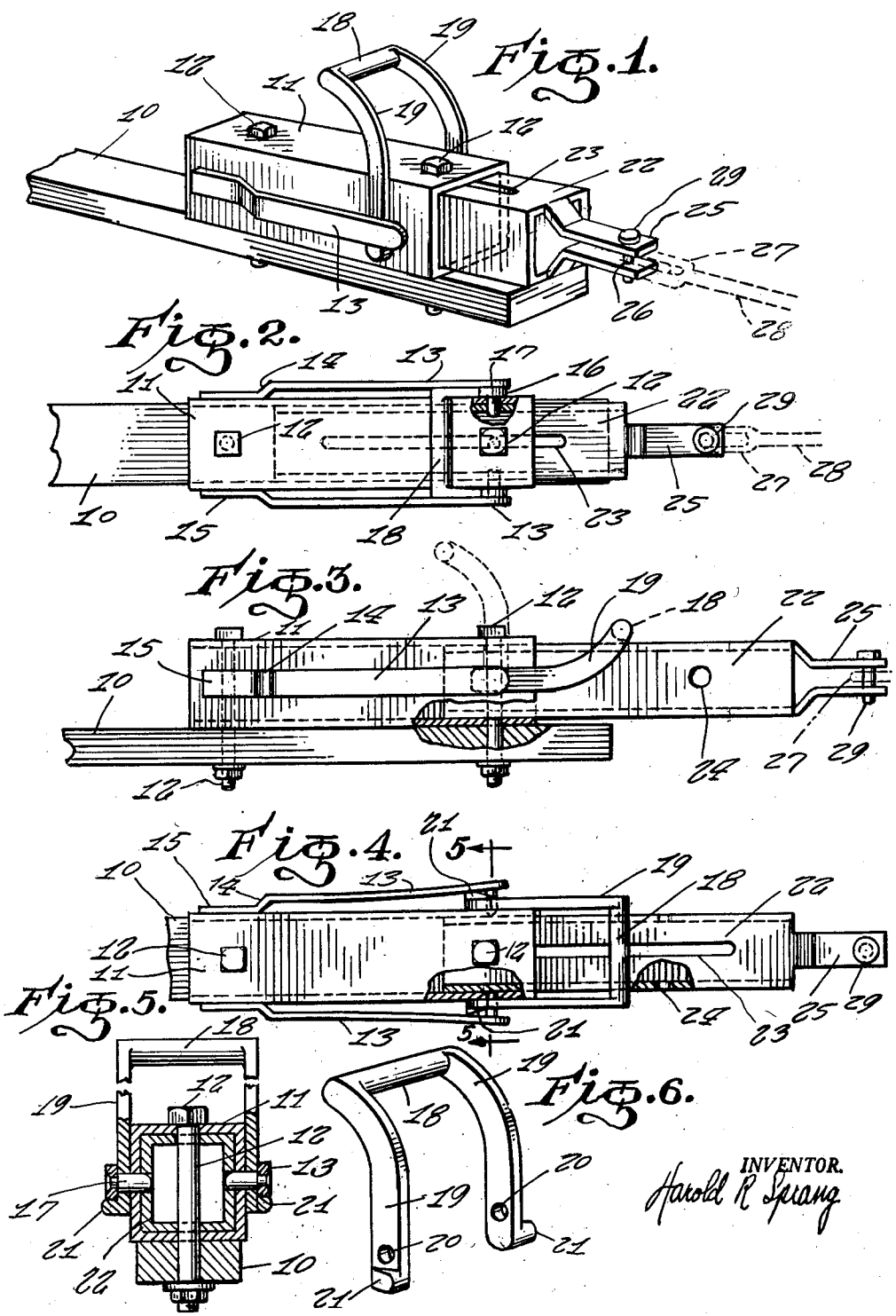

2,818,276

HITCHING DEVICE FOR TRAILERS OR THE LIKE

Harold R. Sprang, Shiloh, Ohio

Application November 25, 1955, Serial No. 548,861

1 Claim. (Cl. 280—482)

This invention relates to hitching devices for trailers or the like.

It is an object of the present invention to provide a telescoping hitching device which may be easily and readily mounted on any existing tongue of a two wheel trailer or four wheel drawn implement.

It is another object of the present invention to provide a hitching device of the above type which includes a handle serving a dual function, namely a convenient grasp to lift the tongue and second, a means by which the unit can be unlatched so that intertelescoping member can be extended or retracted for hitching position.

Other objects of the present invention are to provide a hitching device bearing the above objects in mind which is of simple construction, has a minimum number of parts, is inexpensive to manufacture and efficient in use.

For other objects and a better understanding of the invention, reference may be had to the following detailed description taken in connection with the accompanying drawing, in which:

Figure 1 is a perspective view of a preferred embodiment of the present invention shown in operative use with the handle in the latched or operative position;

Fig. 2 is a top plan view thereof shown partly in section;

Fig. 3 is a side elevational view of the invention showing the handle in the unlatching position;

Fig. 4 is a top plan view of Fig. 3;

Fig. 5 is a vertical sectional view looking along the line 5—5 of Fig. 4, but showing the handle in locking position; and Fig. 6 is a perspective view shown alone of the handle forming a part of the invention.

Referring now more in detail to the drawing, 10 represents the conventional tongue of a two wheel trailer or four wheel drawn implement, substantially as illustrated.

In the practice of my invention, a hollow, rectangular outer casing 11 is fixedly mounted on the tongue 10 by means of the nut and bolt assemblies 12 passing through aligned openings in the casing and tongue, as will be obvious.

A pair of elongated springs 13 are integrally formed at one end with the inwardly extending, offset portions 14 and terminate in the terminal portions 15 extending parallel to the springs 13 and secured to the opposite sides of the outer casing 11 by means of welding.

The inner faces of the free ends of the springs 13 fixedly mount the inwardly extending pins 17 which pass inwardly through suitable openings provided in the opposite sides of the outer casing 11 (Fig. 2). When the springs 13 are in the position of Fig. 2, the inner ends of the pins 17 extend inwardly of the openings in the casings 11 and 22.

In order to move the pins 17 outwardly of the casing against the action of springs 13, a U-shaped handle is provided and includes the central cylindrical portion 18 integrally formed at opposite ends with the arcuate arms 19. As shown in Fig. 6, the arms 19 near their ends remote from the central handle portion 18 are provided with openings 20 which receive therethrough the pins 17 whereby to rotatably mount the handle. The arms 19 on their outer faces at their lower ends are integrally formed with the cam surfaces 21 which upon rotation of the handle from the position of Fig. 1 to that of Figs. 3 and 4, are adapted to move the springs 13 outwardly and to move the pins 17 from the position of Fig. 2 outwardly to a point where they no longer extend beyond the inner face of the outer casing 11 but are still rotatably mounted therewithin.

A hollow, rectangular inner casing 22 in adapted for telescopic sliding movement within the outer casing 11, being provided on the top and bottom therewith the elongated slots 23 which receive downwardly therethrough the endmost bolt assembly 12 whereby to permit sliding movement of the inner member 22 and at the same time limiting its outward displacement. The inner telescopic member 22 is provided on opposite sides thereof with the laterally aligned openings 24 (Fig. 4) which are adapted to receive therewithin the inner ends of the pins 17 when the latter are in the innermost position of Fig. 2, whereby to lock the member 22 within the outer member 11 in the latched position of Fig. 1. The outer end of the inner telescopic member 22 is integrally formed with the inwardly bent parallel and laterally spaced tongues 25 having vertically aligned openings 26 and which cooperate with the elongated eye 27 connected with the connecting shank 28 to receive therethrough the pin 29, the shank 28 being connected in the usual manner to a tractor or automobile or other source of locomotion.

In operation, the device is unlatched by rotating the handle from the position of Fig. 1 to that of Fig. 3, thus forcing the pins outwardly against the action of the springs 13 and to release the openings 24. The inner member may then be extended to the position of Fig. 3. After the handle has moved to the released position, the inner member 22 may be extended or retracted to the hitching position. After the hitch is made, by means of the pin 29, the handle is returned to its upright position. The operator then moves the tractor or other means of power either forward or backward, whichever it takes to relatch the device and to move the pins 17 back into the openings 24 under the action of springs 13. When the openings 24 become aligned with the openings in the outer casing, the pins will drop in due to the pressure of the springs and the unit will be relatched. The device has a built in safety feature and cannot be pulled apart due to the front mount bolt assembly 12 passing through the slot 23 in the inner member. The slot 23 extends to the rear of the mounting bolt more than it does to the front thereof due to the fact that the operator will back more times short of the normal hitching position than he would past it. If the operator does back past the normal hitching, the inner member can be released and retracted to obtain a hitching position. The device may be produced in several different sizes, for example, a light device for small trailers and four wheel drawn implements and a heavy device for heavier types of trailer equipment. The device is particularly handy when hitching a wagon behind another drawn unit such as a hay baler or corn picker.

While various changes may be made in the detail construction, it shall be understood that such changes shall be within the spirit and scope of the present invention as defined by the appended claim.

What I claim as new and desire to protect by Letters Patent of the United States is:

A hitching device comprising an outer housing, means for mounting said outer housing on the tongue of the unit to be hitched, said outer housing at one end having a pair of laterally aligned openings therethrough, a pair of leaf springs on opposite sides of said outer housing, pins secured to the free ends of said leaf springs and passing inwardly through said openings, means for moving said pins outwardly so as not to extend beyond the inner faces of said outer housing, against the action of said leaf springs, an inner housing, telescopically received within said outer housing, said inner housing having a pair of oppositely aligned openings adapted to receive said pins therethrough whereby to lock the same against the outer housing when said pins are in their inwardly extending position and means at one end of said inner housing for connecting the same with a power unit, said means for moving said pins outwardly beyond the inner faces of said outer housing comprising a U-shaped handle having a central portion and a pair of arcuate arms at right angles thereto straddling the opposite sides of said outer housing, said arcuate arms at their ends remote from said central portion having openings receiving said pins therethrough, and cam surfaces on the lower ends of said arcuate arms adapted to rotate said leaf springs outwardly upon rotation of said handle central portion downwardly against the device and to permit said inner housing to be retracted or extended to the hitching position.

References Cited in the file of this patent
UNITED STATES PATENTS

| | | |
|---|---|---|
| 1,178,857 | Kirner | Apr. 11, 1916 |
| 2,404,521 | Myers | July 23, 1946 |
| 2,415,479 | Forney | Feb. 11, 1947 |